(12) United States Patent
Takemura

(10) Patent No.: US 7,409,891 B2
(45) Date of Patent: Aug. 12, 2008

(54) DRIVE UNIT WITH REDUCER

(75) Inventor: Yoshinari Takemura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 298 days.

(21) Appl. No.: 10/576,872

(22) PCT Filed: Jun. 24, 2005

(86) PCT No.: PCT/JP2005/011621

§ 371 (c)(1),
(2), (4) Date: Apr. 21, 2006

(87) PCT Pub. No.: WO2006/003847

PCT Pub. Date: Jan. 12, 2006

(65) Prior Publication Data
US 2007/0039414 A1 Feb. 22, 2007

(30) Foreign Application Priority Data
Jul. 2, 2004 (JP) .............................. 2004-196311

(51) Int. Cl.
*F16H 37/00* (2006.01)
(52) U.S. Cl. ....................................................... 74/640
(58) Field of Classification Search ................... 74/640
See application file for complete search history.

(56) References Cited
U.S. PATENT DOCUMENTS 4,379,976 A * 4/1983 Pitchford et al. ............... 310/83
6,257,186 B1 * 7/2001 Heer ........................ 123/90.17
6,258,007 B1 * 7/2001 Kristjansson ................... 477/7
6,477,918 B2 * 11/2002 Sakamoto ..................... 74/640
6,701,803 B1 * 3/2004 Tamai et al. ................... 74/640

FOREIGN PATENT DOCUMENTS

| JP | 48-21048 | 3/1973 |
|---|---|---|
| JP | 59-009336 | 1/1984 |
| JP | 63-062934 | 3/1988 |
| JP | 01-133546 | 9/1989 |
| JP | 05-141484 | 6/1993 |
| JP | 2001-112215 | 4/2001 |
| JP | 2001-218422 | 8/2001 |
| JP | 2001-254789 | 9/2001 |

* cited by examiner

*Primary Examiner*—Dirk Wright
(74) *Attorney, Agent, or Firm*—Squire, Sanders & Dempsey L.L.P.

(57) ABSTRACT

To provide a harmonic drive gearing with high degree of freedom in terms of layout. A harmonic drive gearing 10 includes a circular spline 1', having outer teeth formed on an outer peripheral surface; an flexible spline 2, positioned at the outside of the circular spline 1', and having inner teeth, which are engageable with the outer teeth of the circular spline 1', formed on an inner peripheral surface; and a rotor 16 which is disposed at outside of the flexible spline 2 and serves as a wave generator, wherein the rotor 16 deflects the flexible spline 2 by minor axis portions of the inner peripheral surface of the flexible spline 2 and engages the inner teeth of the flex spline with the outer teeth of the circular spline 1' and thereby the engagement position between the inner teeth and the outer teeth is adapted to move in a circumferential direction.

7 Claims, 13 Drawing Sheets

DRIVE UNIT WITH REDUCER

FIELD OF THE INVENTION

The present invention relates to a drive unit with reducer.

BACKGROUND ART

A harmonic drive gearing, which serves as a reducer to be used in a conventional drive unit, has a configuration as shown in FIG. 12 (see patent literature 1). That is, in this conventional unit, a flex spline 30 is positioned so as to surround a wave generator 40, which has an outer peripheral surface that is formed to an elliptical shape, across a flexible bearing 50. Also, a circular spline 20, which has a circular inner peripheral surface, is positioned at the outside of the flex spline 30.

Inner teeth are formed on the inner peripheral surface of the circular spline 20, outer teeth, which are engageable with the inner teeth of the circular spline 20, are formed on an outer peripheral surface of the flex spline 30, and the flex spline 30 is enabled to deflect in radial directions. The number of teeth of the flex spline 30 is set to be slightly less than the number of teeth of the circular spline 20.

At its major axis portions, the wave generator 40 deflects the flex spline 30 via the flexible bearing 50 and makes the outer teeth of the flex spline 30 engage with the inner teeth of the circular spline 20.

With a harmonic drive gearing arranged in this manner, when, for example, the wave generator 40 is rotated, the engagement points, at which the outer teeth of the flex spline 30 and the inner teeth of circular spline 20 engage, move in a circumferential direction in accordance with the variation of the positions of the major axis portions of the wave generator 40. In this process, since the number of teeth of the flex spline 30 is slightly less than that of the circular spline 20, when, for example, the wave generator 40 is rotated 360 degrees, the flex spline 30 is rotated in the circumferential direction by the difference in the number of teeth with respect to the circular spline 20.

That is, when the above-described conventional harmonic drive gearing is used as a reducer, in which the wave generator 40 and the flex spline 30 are respectively used as a reducer-input and a reducer-output, the rotation speed of the flex spline 30 is reduced greatly in accordance with the rotation speed of the wave generator 40.

A harmonic drive gearing with such a high speed reduction ratio is used, for example, for generating flexing and extending motions of a leg of a leg type mobile robot. FIG. 13 is a diagram showing a joint of the leg of the leg type mobile robot.

A first link 70 and a second link 90 are joined through a rotary supporting mechanism 91 and are enabled to rotate with respect to each other. A harmonic drive gearing 60 is mounted so that the rotating shaft thereof matches with the center of rotation of first link 70 and second link 90. That is, the circular spline 20 is fixed to the second link 90. The flex spline 30 is fixed, at a first rotating shaft 30a (output shaft), to the first link 70 by means of a plurality of bolts 80.

The wave generator 40 is provided with a second rotating shaft 40a, the second rotating shaft 40a is supported in a manner enabling rotation with respect to the first rotating shaft 30a. A pulley 61, for transmitting a driving force, is fixed to the first rotating shaft 30a at the end section to which the first rotating shaft 30a is not provided.

Here, when the driving force from a motor (not shown) is transmitted to the pulley 61 via a belt 62, the wave generator 40 is driven. Then, the flex spline 30 is rotated at a reduced speed than the rotation speed of the pulley 61 in accordance with the rotation of the wave generator 40, and thus the first link 70 is rotated.

In case of the above-described harmonic drive gearing 60, however, since the position where the flex spline 30 is provided is limited to an end section of the first rotating shaft 30a, the position of the harmonic drive gearing 60 with respect to the first rotating shaft 30a is also restricted to the end section of the first rotating shaft 30a.

Thus, the harmonic drive gearing cannot be positioned between two sets of bearings, when for example the first rotating shaft 30a is supported by two sets of bearings. This provides the problem of low degree of freedom in terms of layout.

Also, since the pulley 61, which transmits a driving force to the wave generator 40 and is disposed on the second rotating shaft 40a, is positioned next to the wave generator 40, the size in a direction along the rotating shaft inevitably becomes large. This may make worse the usability depending on a usage.

Meanwhile, an apparatus, in which the wave generator is provided at an outer periphery side of the flex spline, has been known (see patent literature 2).

[Patent Literature 1]

Japanese unexamined patent publication H5-141484 (claims, claim 1, and FIG. 1).

[Patent Literature 2]

Japanese unexamined patent publication S59-9336 (FIG. 2).

DISCLOSURE OF THE INVENTION

In case of patent literature 2, however, a driving force is applied from one end of the rotation axis and thus the size in an axial direction is large. Additionally, since the rigidity of the members for transmitting the driving force to the wave generator is low, the apparatus cannot provide a sufficient response.

In consideration of the above described defects in conventional apparatuses, the present invention is intended to provide a drive unit with reducer that can improve the degree of freedom in terms of layout and can provide the improved response.

The first aspect of the present invention relates to a harmonic drive gearing which has: a circular rigid gear, having outer teeth formed on an outer peripheral surface; an annular flexible gear, positioned at the outside of the rigid gear, having an inner peripheral length that is greater than the outer peripheral length of the rigid gear, and having inner teeth, which are engageable with the outer teeth of the rigid gear, formed on an inner peripheral surface; and a wave generator, deflecting the flexible gear in radial directions to make the inner teeth of the flexible gear engage with the outer teeth of the rigid gear and moving the engagement positions, at which the flexible gear is deflected, in a circumferential direction, and the wave generator is a rotor of a motor.

The second aspect of the present invention relates to a drive unit with reducer that has: a circular rigid gear, having outer teeth formed on an outer peripheral surface; an annular flexible gear, positioned at the outer side of the rigid gear, having an inner peripheral length that is greater than the outer peripheral length of the rigid gear, and having inner teeth, which are engageable with the outer teeth of the rigid gear, formed on an inner peripheral surface; and a wave generator, deflecting the flexible gear in radial directions to make the inner teeth of the flexible engage with the outer teeth of the rigid gear and moving the engagement positions, at which the flexible gear is deflected, in a circumferential direction.

In this drive unit, the wave generator is a rotating member, which is positioned at the outside of the flexible gear in a manner enabling rotation with respect to the flexible gear and is equipped with pressing portions that press and thereby deflect the flexible gear in radial directions, and the rotating member is a rotor of a motor.

In the third aspect of the invention, in addition to the configuration of the first or second aspect of the invention, a stator of the motor which rotates the rotor is disposed at outer peripheral side of the rotor, and the rigid gear is joined to a first member, and is rotatably supported by a second member at both ends of the rigid gear.

In the fourth aspect of the invention, in addition to the configuration of the first or second aspect of the invention, a total of two flexible gears having a cylindrical part with the same diameter are provided, and flexible gears are disposed so that one end of each of flexible gears is face to face each other, and are respectively engageable to the rigid gear, and each of flexible gears is supported at the other end thereof.

In the fifth aspect of the invention, in addition to the configuration of the first or second aspect of the invention, the rotor includes: an inner peripheral surface formed to an elliptical shape; and a plurality of magnets disposed on the inner peripheral surface, and a plurality of magnets are disposed symmetrically with respect to a major axis or minor axis of the elliptical shape.

In the fifth aspect of the invention, in addition to the configuration of the first or second aspect of the invention, a deformation controller which controls the deformation of the rotor is disposed at outer periphery of the rotor.

In the fifth aspect of the invention, in addition to the configuration of the first or second aspect of the invention, the rotor is adapted to cause a magnetic flux along a rotation axis of the motor, and a stator is adapted to cause the magnetic flux along the rotation axis. Here, the stator is disposed facing the regions wherein a magnetic flux is caused of the rotor.

In this first aspect of the invention, the rigid gear is disposed at an inside, the flexible gear is disposed at an outside of the rigid gear, and the wave generator is composed of a rotor of a motor that is disposed at an outside of the flexible gear and is rotatable with respect to the flexible gear. In this case, by deflecting the flexible gear by the rotor of the motor, the outer teeth of the rigid gear can be engaged with the inner teeth of the flexible gear by the deflected section of the flexible gear.

Also, since the wave generator is a rotor of the motor, the output of the motor can be directory used as an input to a harmonic drive gearing, and thus the size of the harmonic drive gearing can be compacted. Furthermore, the rigidity at an input part of the harmonic drive gearing can be high and the response of the apparatus can be improved.

Here, when the rotation shaft of the rigid gear is, for example, made as a hollow structure and used for an wiring of an electrical harness, since the rotation speed of the rigid gear with respect to the rotation speed of the rotor is decreased largely, the causing of damage on harnesses can be limited.

According to second aspects of the invention, since the rotor of the motor is positioned at the outermost side, the size in the axial direction can be made small in comparison to the conventional art.

Additionally, since the rotor of the motor is positioned at outside in a radial direction than the flexible gear, it is not required to using one end or both ends of the rotation axis for the input of a driving force. Thus, this improves the degree of freedom in terms of layout in the vicinity of each end of the rotation axis.

In this case, since the wave generator is a rotor of the motor and the flexible gear is deflected mechanically by the pressing portions, the outer teeth of the rigid gear and the inner teeth of the flexible gear can be engaged reliably.

According to third aspect of the invention, the size of the joint of the link can be minimized while allowing high torque transmission.

According to fourth aspect of the invention, the size in a width direction of the flex spline can be wide, and further high torque transmission can be enabled.

According to fifth aspect of the invention, a torque ripple is reduced, and also flux paths are symmetrically formed. Thus, since an appropriate flux path is produced, a magnetic resistance becomes low, and a maximum torque of the motor is improved.

According to sixth aspect of the invention, since deformation of the rotor is controlled by a deformation controller, the rigidity of the wave generator can be high.

According to seventh aspect of the invention, the occurrence of an upset of a magnetic flux is not caused. As a result, a heat to be caused due to the upset of a magnetic flux can be controlled. Also, the size of the outer diameter of the rotor can be made large irrespective of the arrangement of the stator, the rigidity of the wave generator can thus be maintained at high.

DESCRIPTION OF THE PREFERRED EMBODIMENTS

The embodiments of the present invention shall now be described.

Firstly, as a fundamental configuration of the drive unit with reducer, an embodiment, in which a flexible gear is positioned at an outside of a rigid gear and in which a pulley at an outside of the flexible gear is adopted as a reducer input, will be explained.

Figure 1:
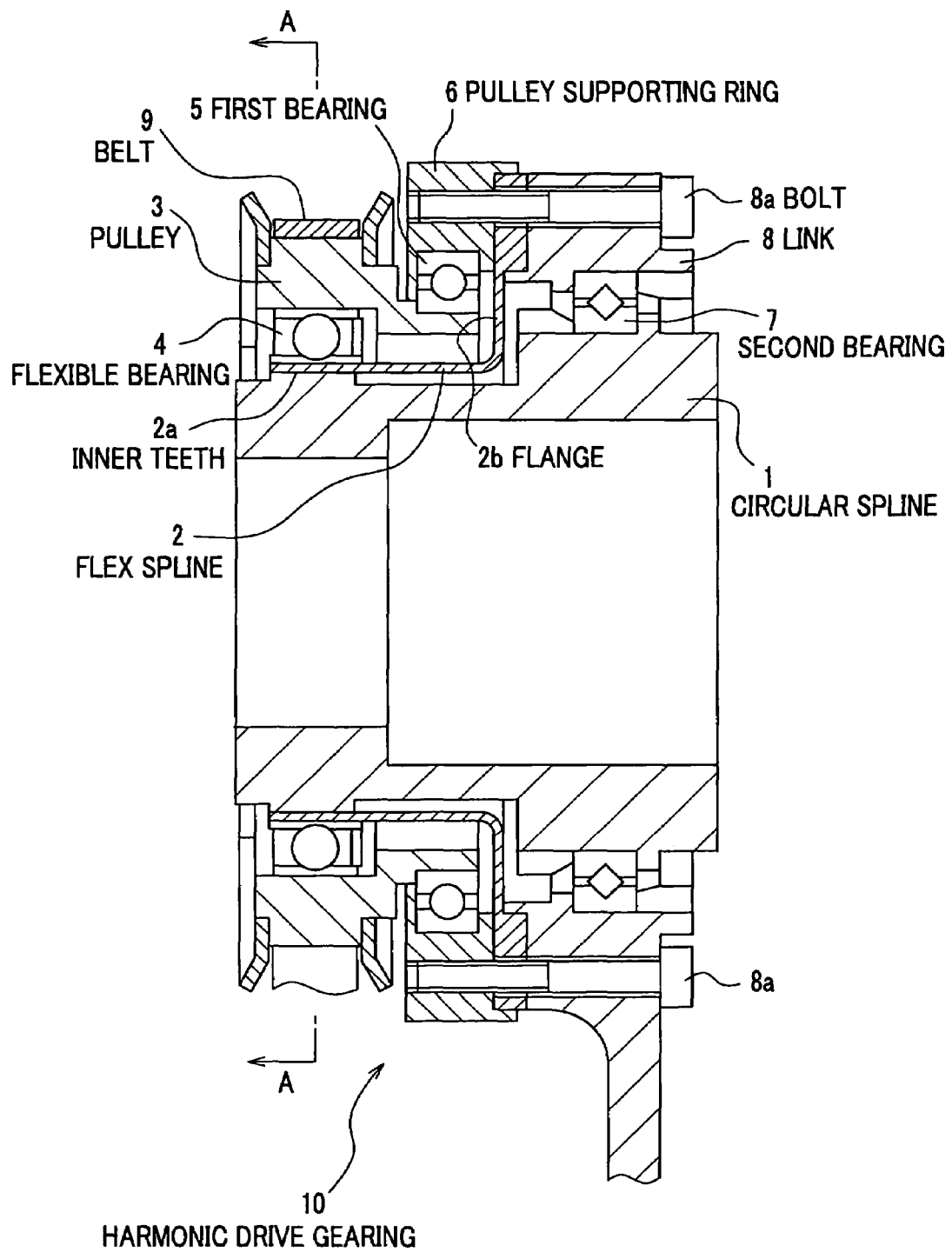
FIG. 1 is an explanatory view showing the configuration of a harmonic drive gearing, which is a basic unit of a drive unit with reducer.
Figure 2:
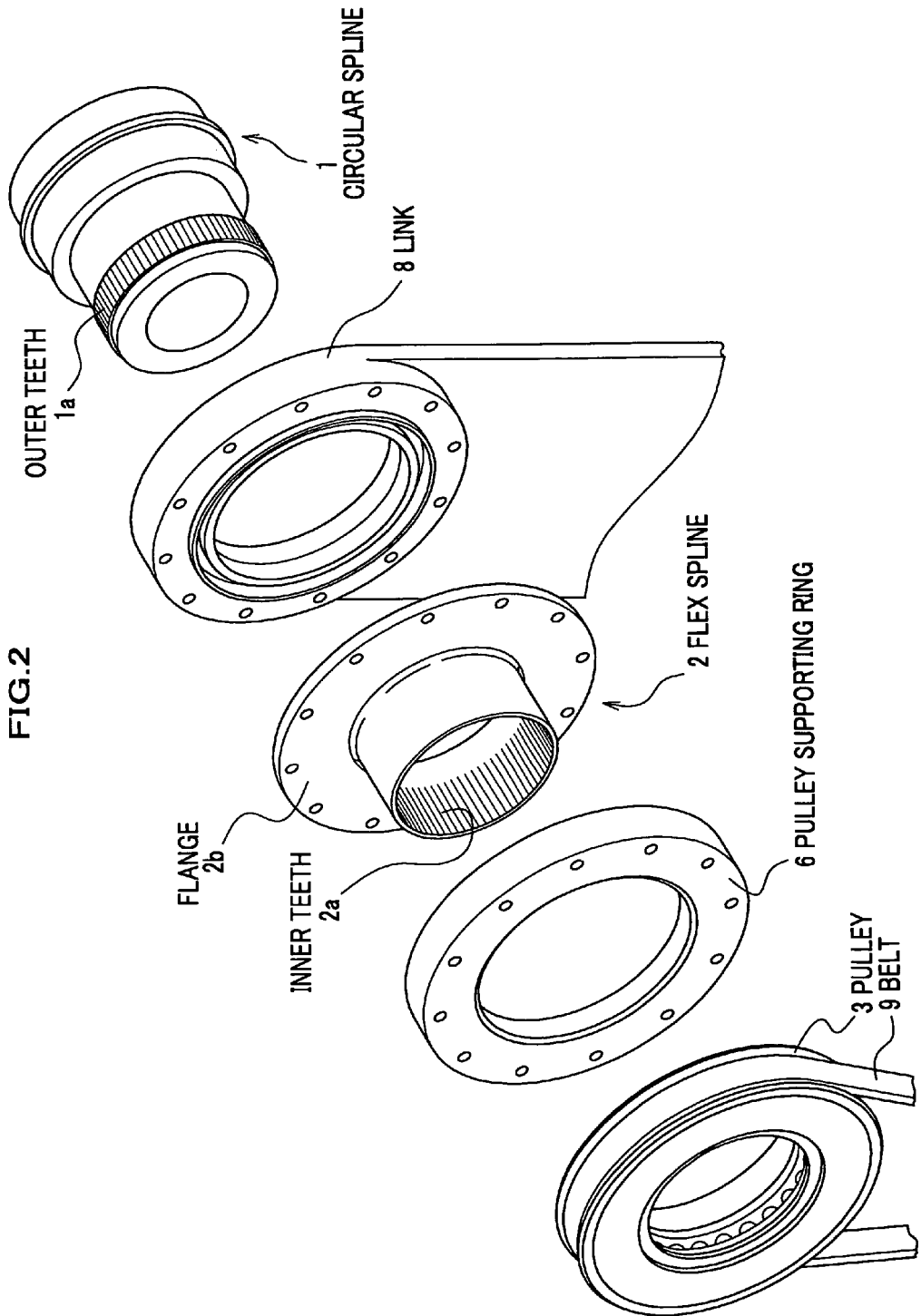
FIG. 2 is an exploded perspective view of the harmonic drive gearing.
Figure 3:
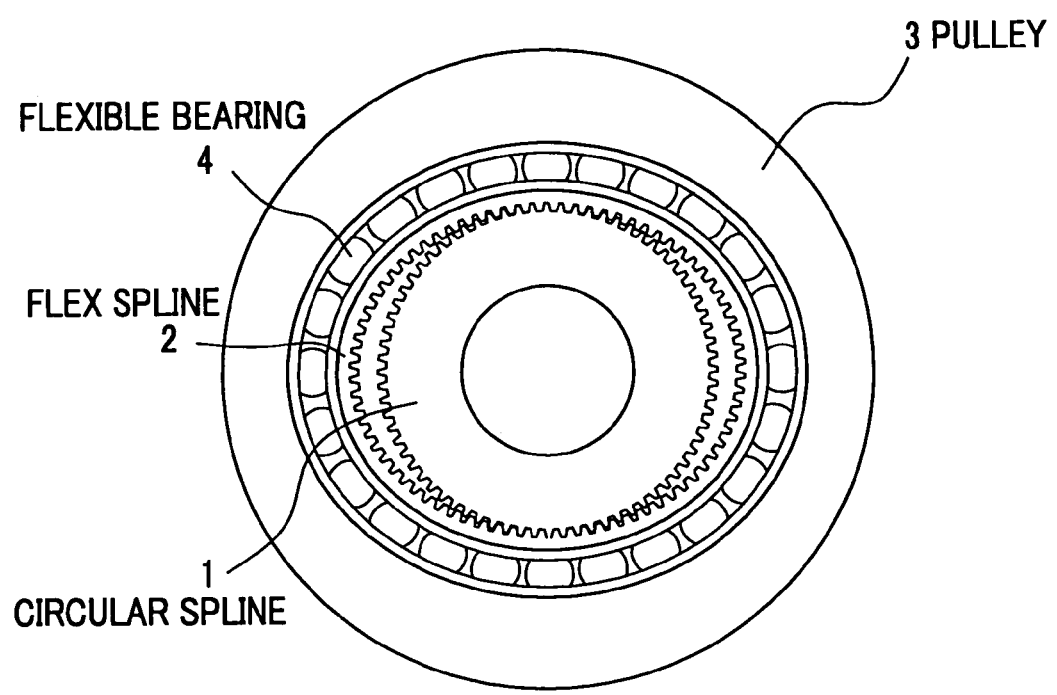
FIG. 3 is a schematic view showing the A-A section of FIG. 1.

FIG. 1 is an explanatory view showing the configuration of a harmonic drive gearing, which is a basic unit of a drive unit with reducer; FIG. 2 is an exploded perspective view of the harmonic drive gearing; and FIG. 3 is a schematic view showing the A-A section of FIG. 1.

A harmonic drive gearing 10 mainly includes a circular spline 1, serves a rigid gear, a flex spline 2, positioned at the outside of the circular spline 1, and a pulley 3, positioned at the outside of the flex spline 2.

As shown in FIG. 2, the circular spline 1 has outer teeth 1a formed on an outer peripheral surface at the end section of a small-diameter portion, and has a through hole at a central portion thereof. The flex spline 2 is a cylindrical member having flexibility that enables deformation in a radial direction. The flex spline 2 has inner teeth 2a, which are engageable with outer teeth 1a, on the inner peripheral surface thereof, and has a rigid flange 2b at an end portion thereof. Here, the position where the flange 2b is formed is the end position opposite to the inner teeth 2a. Outer teeth 1a of the circular spline 1 are set to be less in number than the inner teeth 2a of the flex spline 2.

The pulley 3 is provided with a groove, to which a belt 9 is fitted, at a circular peripheral surface thereof, and an inner peripheral surface of the pulley 3 is formed to an elliptical shape whose center is the same as that of the outer peripheral surface of the pulley 3. The pulley 3 deflects the flex spline 2 through a flexible bearing 4, and fits inner teeth 2a of the flex spline 2 to outer teeth 1a of the circular spline 1 at minor axis portions of the pulley 3.

That is, the minor axis portions thus function as pressing portions that press the flex spline 2 in a radial direction and thereby deflect the flex spline 2. The pulley 3 thus serves not just the function of a pulley for transmitting a driving force but also serves the function of a wave generator in the harmonic drive gearing.

As shown in FIG. 1, at the respective sides of the flange 2b of the flex spline 2 are positioned a pulley supporting ring 6 and a link 8, and the pulley supporting ring 6 and the link 8 are connected across the flange 2b by a plurality of bolts 8 that are aligned in a circumferential direction.

In the flex spline 2, the flange 2b serves as a fixed end and the region where inner teeth 2a are provided is adapted to deflect in a radial direction. As shown in FIG. 1, a pulley supporting ring 6 supports the pulley 3 via a first bearing 5, and the link 8 supports the circular spline 1 via a second bearing 7.

By this configuration, the circular spline 1 can be rotated relative to the flex spline 2. Meanwhile, the pulley 3 can rotate while deflecting the outer peripheral surface of the flex spline 2 via the flexible bearing 4. That is, the pulley 3, the flex spline 2, and the circular spline 1 can thus be rotated relatively and independently while maintaining a predetermined relationship with each other.

By using one of these three rotating elements as an input and using one of remainder of rotating elements as an output, the harmonic drive gearing of this embodiment can be used as a reducer or a speed-increasing gear. Additionally, by using one of these three rotating elements as an output and using remainder of rotating elements as an input, the harmonic drive gearing of this embodiment can provide the function of a differential mechanism.

Figure 4A:
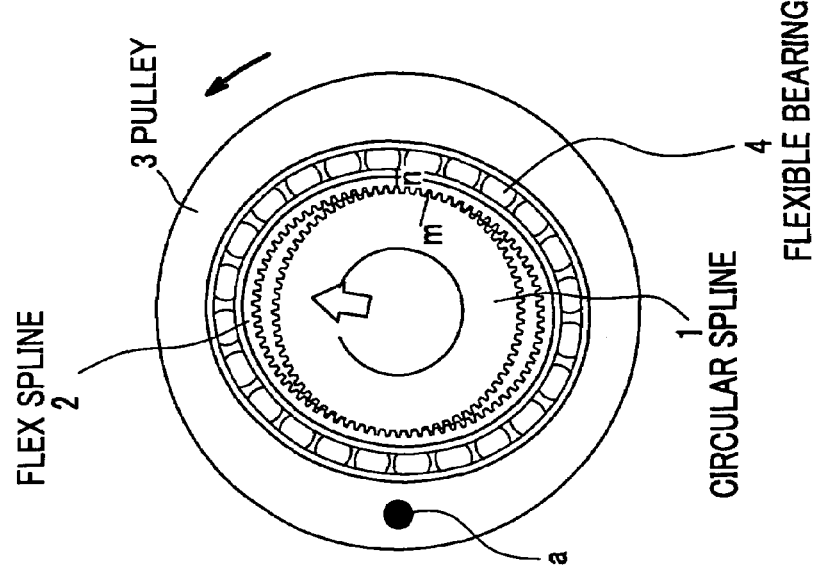
FIG. 4A to FIG. 4C are explanatory views illustrating the operation in the case where a circular spline is driven by applying a driving force to a pulley while keeping a flex spline fixed.
Figure 4B:
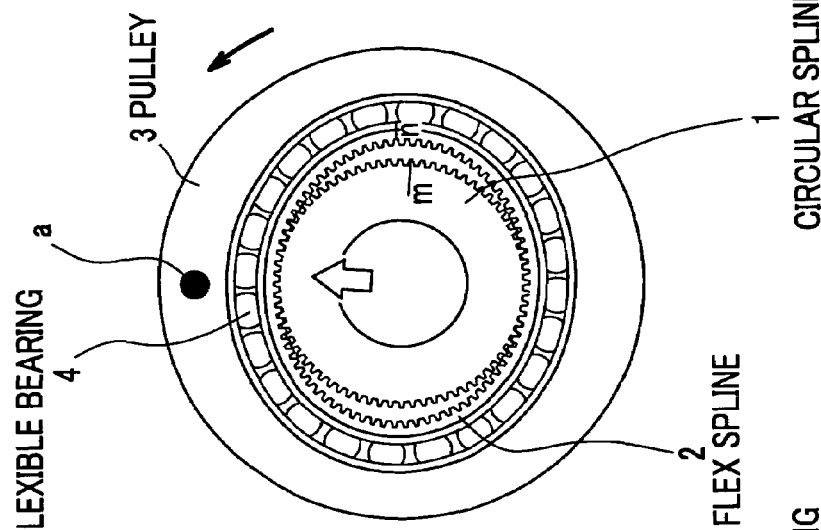
Figure 4C:
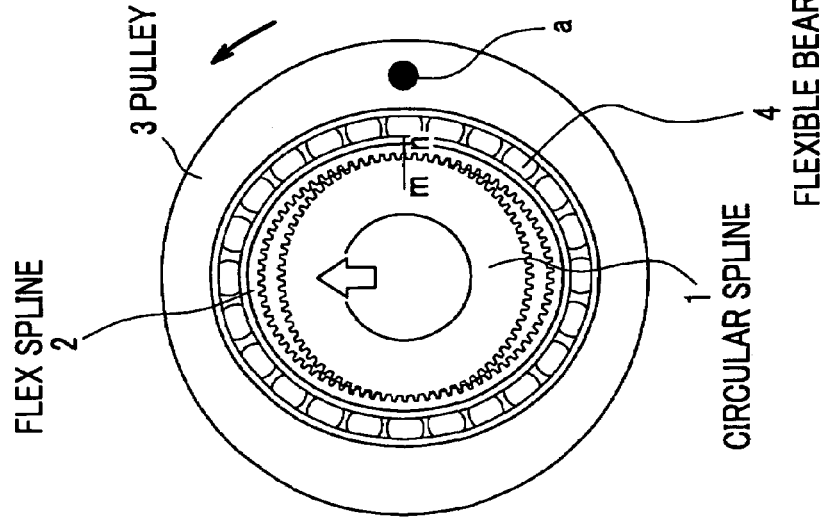

The operation of harmonic drive gearing 10 shall now be described. FIG. 4A to FIG. 4C shows diagrams illustrating the operation in the case where the circular spline is driven by applying a driving force to the pulley while keeping the flex spline fixed.

In FIG. 4A, teeth m of the circular spline 1 and teeth n of the flex spline 2 are engaged at minor axis portions of the inner peripheral surface of the pulley 3.

When an engagement point in this state is indicated as "a" and the pulley 3 is rotated by 90 degrees in the counterclockwise direction, engagement point "a" is rotated by 90 degrees in the same manner as the minor axis portion of the inner peripheral surface of the pulley 3 as shown in FIG. 4B. In this process, due to the shifting of the engagement point, teeth m and teeth n become disengaged.

When the pulley 3 is rotated further by 90 degrees, that is, rotated by 180 degrees in the counterclockwise direction from the position of FIG. 4A, engagement point "a" is likewise rotated by 180 degrees. Though teeth n of the flex spline 2 become engaged again with teeth of the circular spline 1, since the number of teeth of the circular spline 1 is less than that of the flex spline 2, teeth m of the circular spline 1 will be shifted from teeth n.

Thus, when the flex spline 2 is fixed, the rotation speed of the circular spline 1 is greatly reduced with respect to the rotation speed of the pulley 3 and a large reduction ratio is thus obtained when the harmonic drive gearing 10 is used as a reducer.

In the harmonic drive gearing 10 having the above descried configuration, the pulley 3 is positioned at the outermost periphery and the circular spline 1, by which the rotation speed is decreased with respect to the pulley 3, is positioned at the central portion. Thereby, the rotating shaft of circular spline 1 may, for example, be made a hollow structure for installing therein an electrical harness.

In this case, since the rotation speed of the circular spline 1 is low, the rubbing between the rotating shaft and the harness will be low and the possibility of the harness becoming damaged will thus be low. Also, even if a fluid is made to flow via the rotating shaft in order to lubricate the harmonic drive gearing 10, the fluid will not be prevented from reaching targeted portions due to centrifugal force.

Also in the case of use as a reducer, by applying a driving force to the pulley 3 disposed at the outermost periphery, the driving force can be output from the circular spline 1 disposed at the central portion.

In this case, as shown in FIG. 1, since the circular spline 1 is at the innermost side and a pulley for transmitting a driving force does not exist in the axial direction as in the conventional arrangement, the position on an output shaft of the circular spline 1 can be set freely and a driving force can be output from both ends of the output shaft.

The disposing position of the harmonic drive gearing 10 with respect to the output shaft can thus be set not just at an end portion of the output shaft but at an inner side as well. A driving force can be output from the output shaft that extends from both sides of the harmonic drive gearing, when the position of the harmonic drive gearing 10 is nearer to the middle than the end of the output shaft.

Next, a drive unit with reducer in which a rotor of the drive motor is used as a wave generator will be explained.

Figure 5:
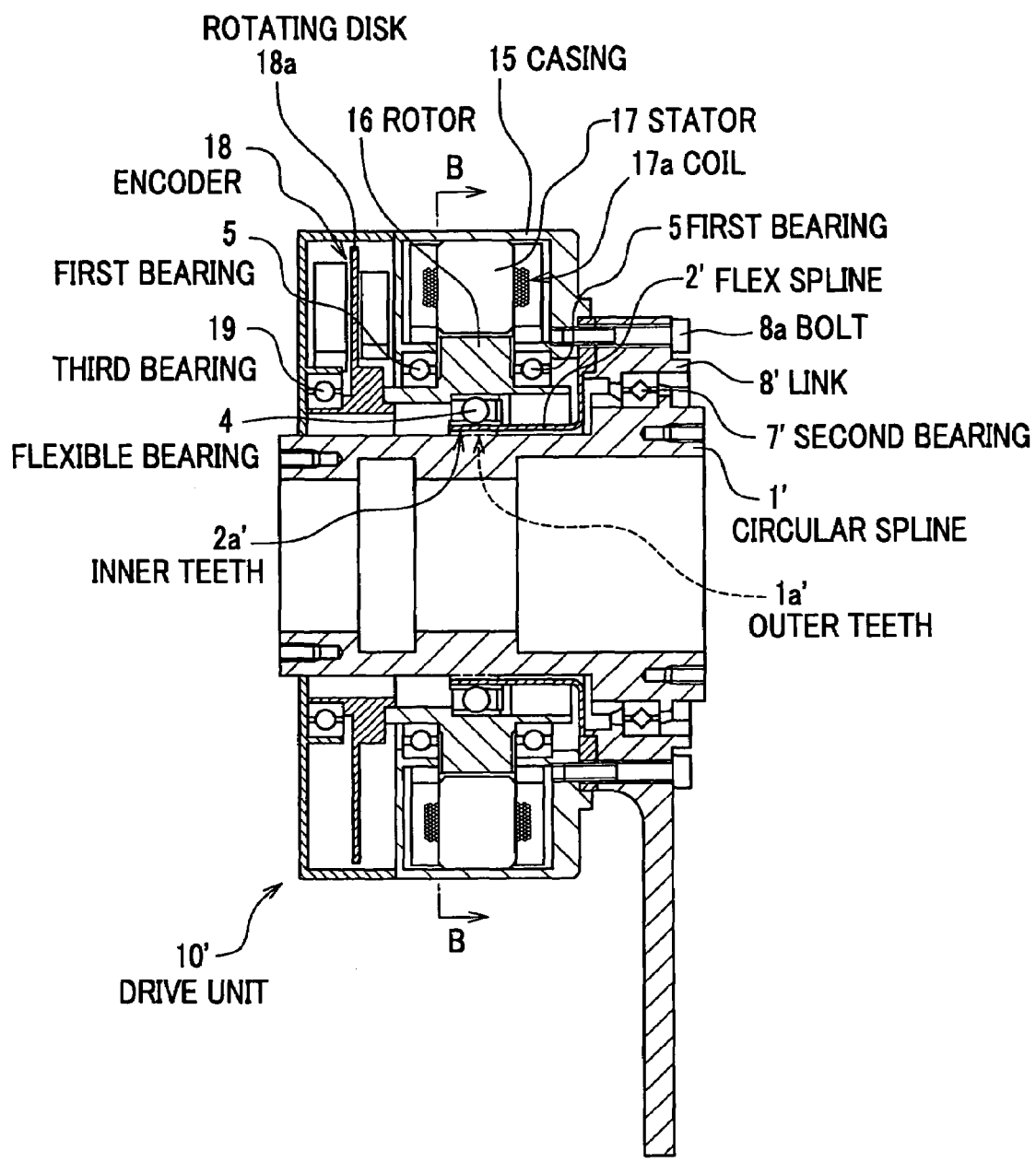
FIG. 5 is a sectional view showing the configuration of the drive unit with reducer.
Figure 6:
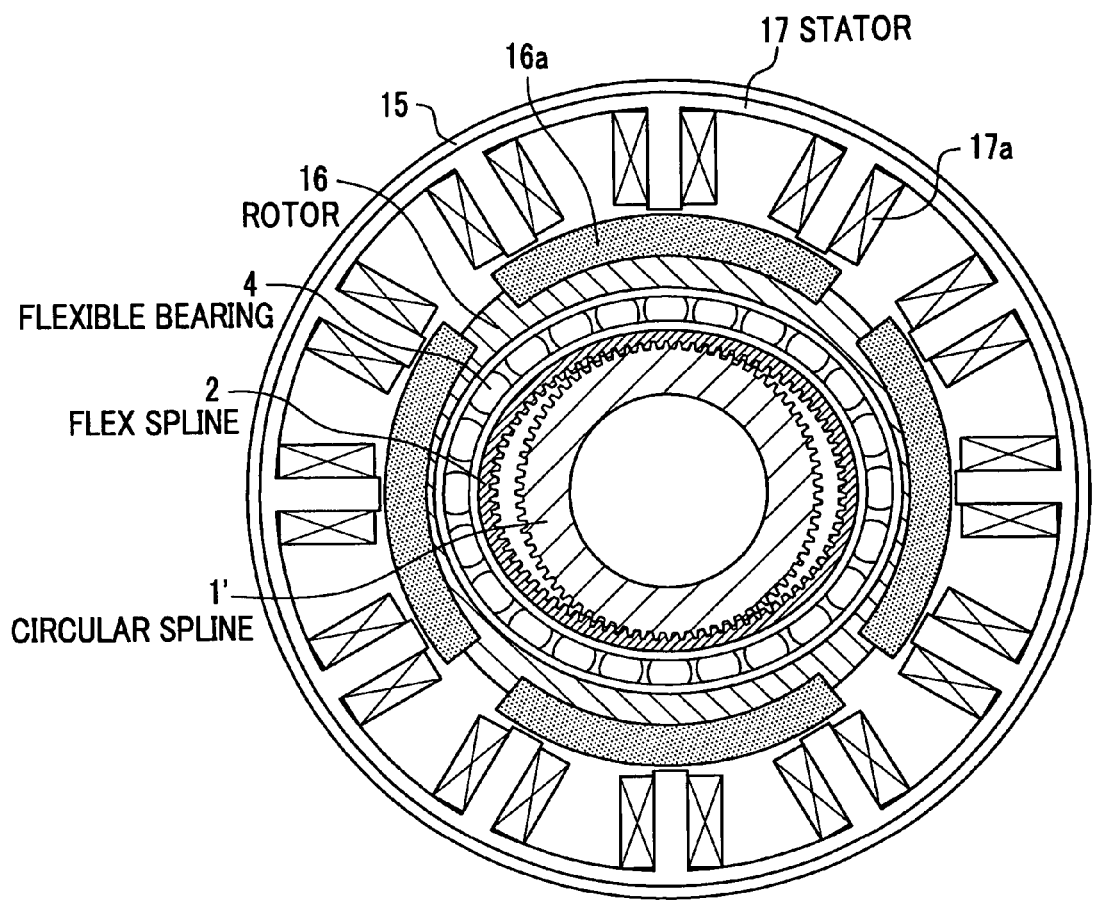
FIG. 6 is a schematic view showing the B-B section of FIG. 5.

FIG. 5 is a sectional view showing the configuration of the drive unit with reducer. FIG. 6 is a schematic view showing the B-B section of FIG. 1.

When using the harmonic drive gearing 10, which is a basic unit of a drive unit with reducer, is used as a reducer, a downsized apparatus in which a power source is put together with a reducer can be configured, by using the rotor of a motor as the pulley 3 and by outputting directory a driving force given by the motor after reducing the speed.

In a drive unit 10' with a reducer, as shown in FIG. 5, a flex spline 2', having inner teeth 2a', is disposed at the outside of a circular spline 1', having outer teeth 1a', and a rotor 16, which is an example of a rotation axis of the motor, is disposed at the outside of flex spline 2' across flexible bearing 4.

Here, the rotor of this embodiment produces a rotation by receiving a magnetic force, e.g. an attractive or repulsive force, that is caused between the rotor and a stator which is disposed coaxially with respect to the rotor. A permanent magnet or an electric magnet is provided to the rotor, and interacts with the stator facing to this rotor.

An inner peripheral surface of the rotor 16 is formed to an elliptical shape and the rotor 16 deflects the flex spline 2' with its minor axis portions to make the inner teeth 2a' of the flex spline 2' engage with outer teeth 1a' of the circular spline 1'. That is, the rotor 16 functions as a wave generator, like the pulley 3 of the above-described harmonic drive gearing 10.

The circular spline 1' is rotatably supported by a link 8' via a second bearing 7', and the flex spline 2' is fixed by bolts 8a with its flange being sandwiched between the wall surfaces of the link 8' and a casing 15.

The rotor 16 is rotatably supported by the casing 15 via pair of first bearings 5. A stator 17 is disposed at the outside of the rotor 16 and is fixed to the casing 15. A plurality of salient poles are formed along a circumferential direction of the stator 17 and a coil 17a is wound around each of the salient pole. By successively supplying electricity to these coils 17a, a rotating magnetic field across the rotor 16 can be formed.

Figure 7:
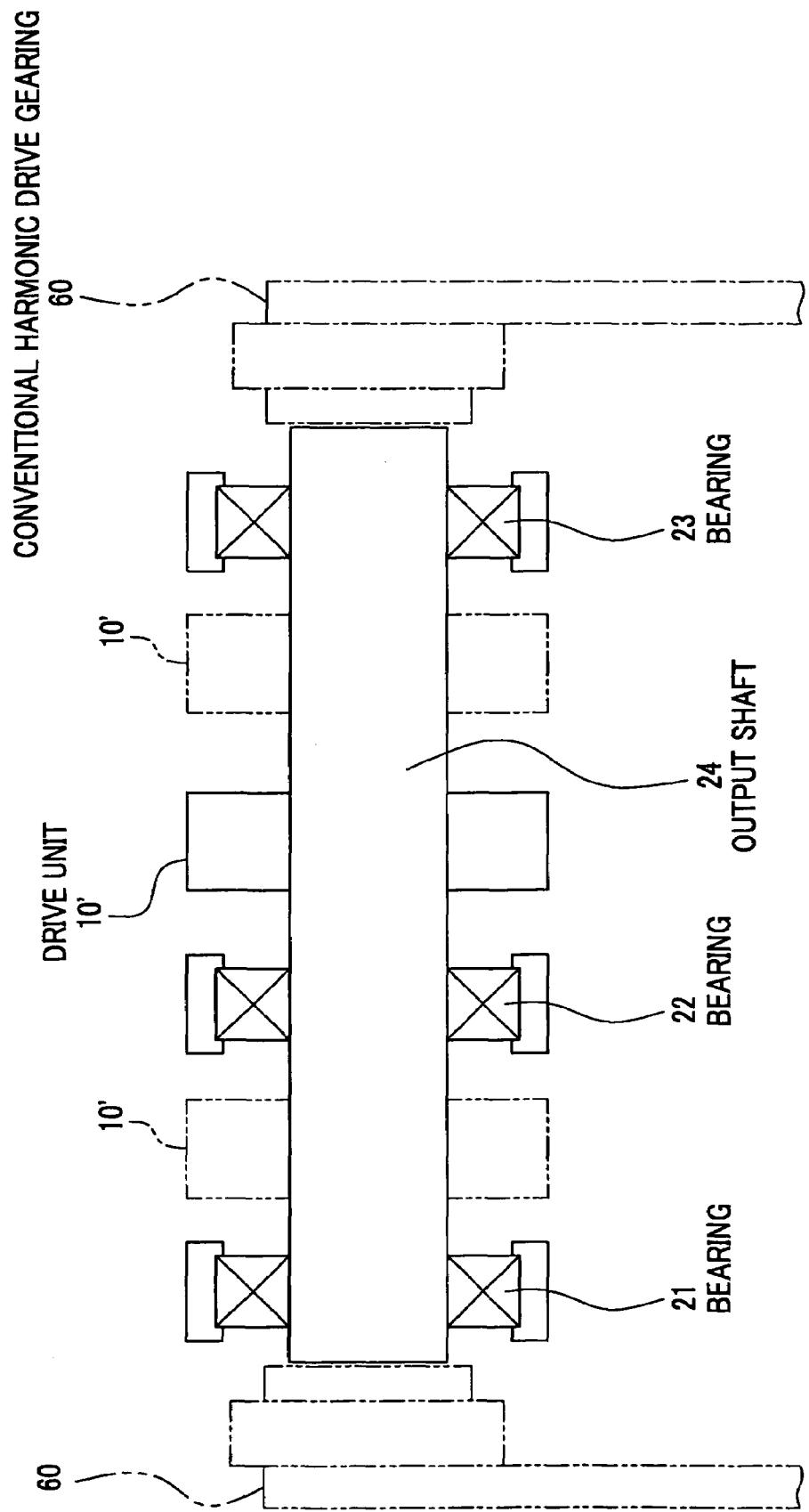
FIG. 7 is an explanatory view showing a positional layout of the drive unit with reducer.

As shown in FIG. 7, the rotor 16 has a plurality of permanent magnets 16a disposed at equal intervals along the circumferential direction, and the rotor 16 can thus rotate upon receiving a driving force by magnetic attractive or repulsive force with respect to the stator 17.

An encoder 18, which detects the rotation speed of the rotor 16, is disposed at an end side in a longitudinal direction of the circular spline 1'. A rotating disk 18a of the encoder 18 is rotatably supported by casing 15 via a third bearing 19 and is connected to the rotor 16.

The drive unit 10' with reducer has a configuration as described above, and the rotor 16 of this unit is driven by successively supplying electricity to respective coils 17a of the stator 17. By this rotation, the engagement points between the circular spline 1' and the flex spline 2' are moved in a circumferential direction, and the circular spline 1' is thus driven in a speed-reduced manner.

When the rotor 16 rotates, since information indicating the rotation angle of the rotating disk 18a is prepared by the encoder 18, the rotation speed of the rotor 16 can be detected using this information.

Since the rotor 16 thus has a function of a wave generator and also makes up a motor along with stator 17 and provides the function of an output shaft that outputs the driving force of the motor, the driving force can be output directly upon being speed-reduced.

According to the drive unit 10' with reducer, benefits as follows can be obtained. That is, firstly, since the motor is not disposed at the end of the shaft and a coreless type motor is adopted and is disposed at an outer peripheral side, the length in a axial direction can be shortened. Here, in the conventional harmonic drive gearing which consists of a flexible gear with outer teeth, since the motor is too small in comparison to an output of the harmonic drive gearing if the wave generator is integrated with the rotor (outer rotor), the apparatus is not suitable for practical use.

Additionally, when controlling the rotation of the motor, it is difficult to make large the speed loop gain in order to maintain the control, when the rigidity of respective members from the motor to the rotator is low.

In this embodiment, however, since the rotor itself functions as the wave generator and is not joined with the wave generator through the axis, it can be considered that an elastic element to the rotator does not exist. Thus, the response can be improved by making higher the speed loop gain. Furthermore, since the rotor has a cylindrical shape and is large in diameter, this provides a high torsional rigidity and hereby a response becomes good.

In the drive unit 10' with reducer, additionally, since the motor is made as a hollow structure and has a wide surface area, a superior cooling capacity and a keeping of high torque are expected.

Furthermore, since three parts, i.e. a motor, a wave generator, and a flex spline, are integrated, the assembling is completed by a fastening after the insertion of integrated parts into the link, which has the circular spline. Thus, the number of parts and the number of man-hour to be required for assembling can be decreased, and hereby a reducing of cost is enabled.

Still furthermore, in the conventional manner, a key for preventing the rotation has been used when joining each shaft of the motor and wave generator. Since this key is not required in the drive unit 10' with reducer, the occurrence of rattling due to a fatigue of a groove of key can be prevented. Thereby, the rattling on the torque transmission path from the rotor to the wave generator can be zero. Also, a response of the wave generator can be improved as described above, and noise decreasing and improved durability can be expected.

Conventionally, the joining method, which uses a tapered shaft and a tapered housing and requires sufficient accuracy, has been done, when joining each shaft of the motor and wave generator. In the case of the drive unit 10' with reducer, a treatment of tapering is not required, and the reduction of the number of man-hour and the reducing of cost are thus enabled.

In this embodiment, additionally, the degree of freedom in terms of layout of the drive unit with reducer can be improved.

FIG. 7 is an explanatory view showing a positional layout of the drive unit with reducer. As illustrated, in the conventional harmonic drive gearing 60, since a belt for transmitting a driving force exists at the side, the position of the harmonic drive gearing is limited to an end portion of output shaft 24 (first rotating shaft 30a).

The output shaft can thus be set only at one side with such an arrangement. On the other hand, in the case of the drive unit 10' with reducer of the present embodiment, since the output shaft can be disposed at both ends, the position of the harmonic drive gearing can be set not only at an end portion but also between bearings 21, 22, and 23 that support the output shaft 24 (rotating shaft of circular spline 1) as illustrated. Thus, the degree of freedom in terms of layout can be improved.

Figure 8:
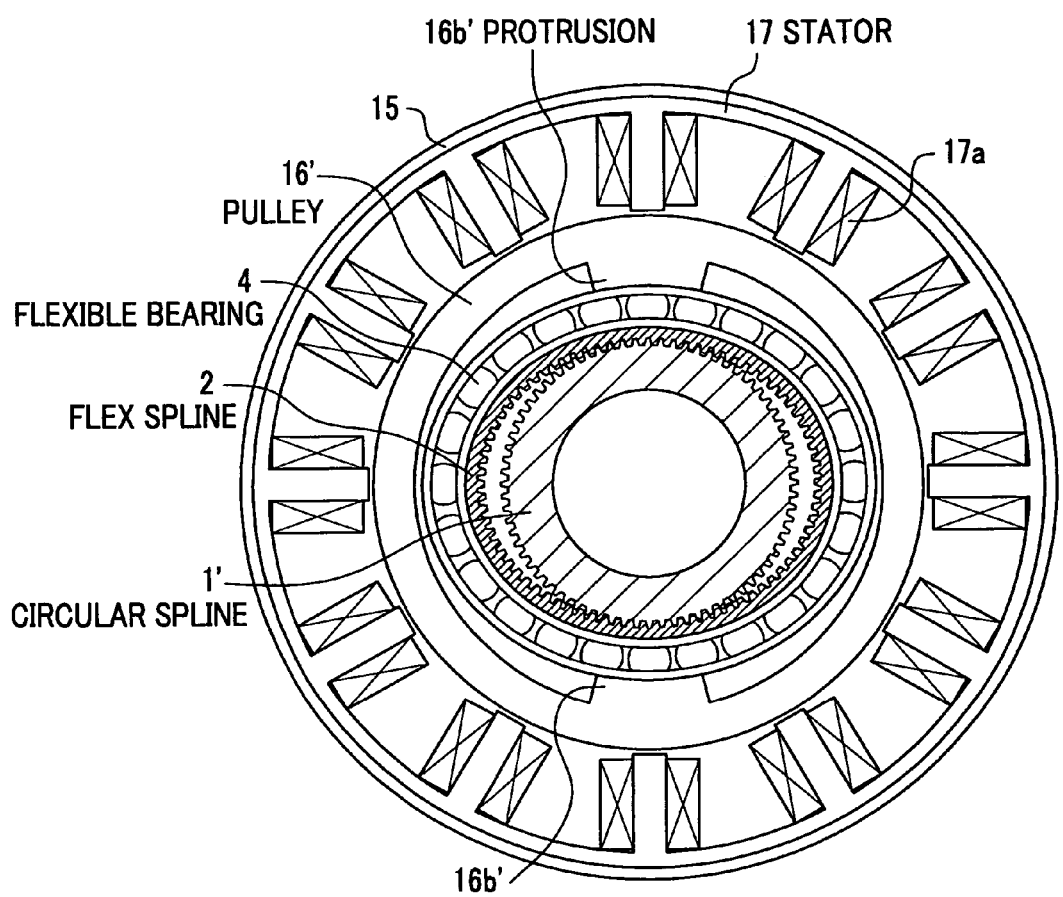
FIG. 8 is an explanatory view showing a modification example of the rotor.

In this embodiment, the inner peripheral surface of the rotor 16 is made elliptical and the flex spline 2 is deflected by the minor axis portions, the inner peripheral surface does not necessarily have to be of elliptical shape, and for example as shown in FIG. 8, protrusions 16b' and 16b' may be formed as pressing portions at two opposing locations of a circular inner peripheral surface and the flex spline 2 may be deflected by means of protrusions 16b' and 16b'.

In this case, when the rotor 16' is rotated in the same manner as the above-described embodiment, protrusions 16b' and 16b' cause the engagement points of the flex spline 2 and the circular spline 1' to move to thereby enable the rotation speed of the circular spline 1 to be reduced. The end surface of each of protrusions 16b' and 16b' may be a portion of a circle or a portion of an ellipse. As a matter of course, just one protrusion 16b' may be formed.

Figure 9:
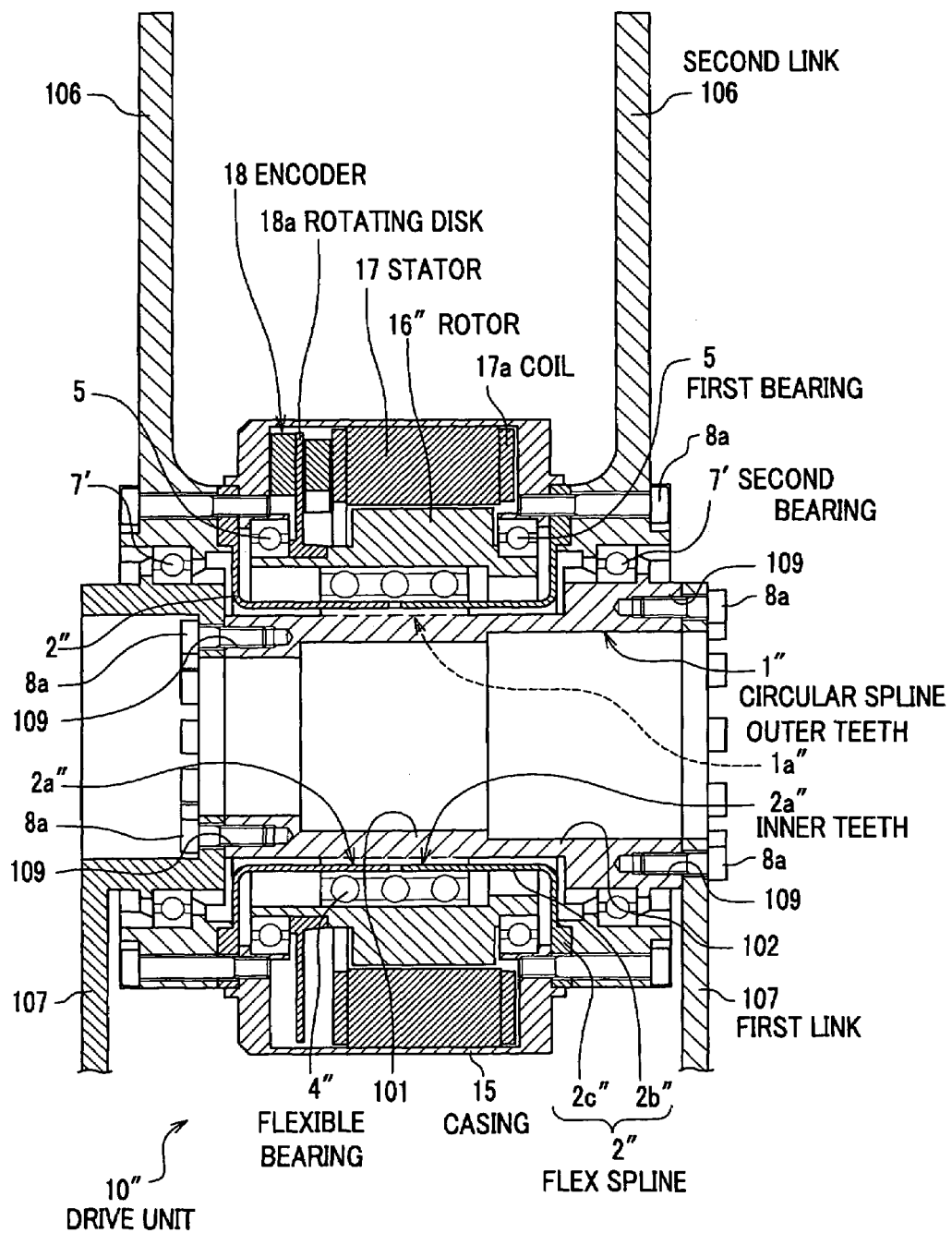
FIG. 9 is a sectional view showing another modification example of the drive unit with reducer.

Next, the modification example of the drive unit with reducer of FIG. 5 will be explained. FIG. 9 is a sectional view showing another modification example of the drive unit with reducer.

The drive unit 10" with reducer shown in FIG. 9 corresponds to the unit which is realized by changing the supporting manner of the circular spline 1' of the drive unit 10' with reducer of FIG. 5 from a single support to a double support By disposing the harmonic drive gearing at the outside of the flex spline 2', the double support is enabled. In the drive unit 10" with reducer, a flex spline 2", having inner teeth 2a" formed thereon, is positioned at the outside of a circular spline 1", having outer teeth 1a" formed thereon, and a rotor 16" is positioned via flexible bearing 4 at the outside of the flex spline 2".

An inner peripheral surface of the rotor 16" is formed to an elliptical shape, and the rotor 16" deflects the flex spline 2" by minor axis portions thereof to engage inner teeth 2a" of the flex spline 2" with outer teeth 1a" of the circular spline 1". Thus, like the rotor 16 of FIG. 5, the rotor 16" functions as a wave generator.

The circular spline 1" comprises a cylindrical section 101 which is inserted into the inside of the flex spline 2" and a link connection section 102 which has a cylindrical shape slightly larger than the cylindrical section 101. The link connection section 102 is disposed at a right side in FIG. 9 with respect to the cylindrical section 101.

At right side end of the link connection section 102, bolt holes 109 are provided, and by screwing bolts 8a into bolt holes 109, the first link 107, which is a first member, is fixed to the link connection section 102.

Similarly, at left side end of the cylindrical section 101, bolt holes 109 are provided, and by screwing bolts 8a into bolt holes 109, the first link 107, which is a first member, is fixed, from left side, to the cylindrical section 101.

As described above, since the inner diameter of the cylindrical section 101 is smaller than the inner diameter of the flex spline 2", an assembling by inserting into the flex spline 2" is easily achieved.

One end, a right side end in FIG. 9, of the circular spline 1" is rotatably supported by the second link 106, which is a part of a second member, through the second bearing 7'. The other end, a left side end in FIG. 9, of the circular spline 1" is rotatably supported by the second link 106 through the second bearing 7'.

Since the circular spline 1" is rotatably supported at both sides thereof, the drive unit 10" with reducer can be applied to a joint which requires high torque, such as a joint of a robot.

Here, the circular spline 1" may be rotatably supported by the member, such as the casing 15, which is integrated with the second link.

The flex spline 2" comprises a cylindrical section 2b", which is deflectable in a radial direction, and a flange section 2c", which elongates in a radial direction from the end of the cylindrical section 2b". At inner surface of the cylindrical section 2b", inner teeth 2a" are formed. In this drive unit 10", two flex splines 2" having the same configuration are disposed, and each end (end side) of the cylindrical section 2b of the flex splines 2" is located face to face each other.

The flange section 2c" located in a right side in FIG. 9 is sandwiched between the casing 15 and the second link 106 of right side, and is fixed by bolts Ba. The flange section 2c" located in a left side in FIG. 9 is sandwiched between the casing 15 and the second link 106 of left side, and is fixed by bolts 8a.

By this arrangement, the width of inner teeth 2a" is made large by disposing flex splines 2" so that each cylindrical section 2b of flex splines 2" is face to face each other. The drive unit 10" with reducer can provide high torque transmission.

The function and configuration of the rotor 16" and the stator 17 is the same as that of the rotor 16 and the stator 17 of FIG. 5. The rotor 16" is rotated by an energization to the coil 17a of the stator 17. Also, a rotating disk 18a is fixed to the outer periphery at the other end side of the rotor 16, and by detecting the rotation of the rotating disk 18a using the encoder 18, the rotation angle and speed of the rotor 16" is thus measured.

The drive unit 10" with reducer has a configuration as described above, and by successively supplying electricity to the respective coils 17a of the stator 17, the rotor 16" is driven. Then, by this rotation, the engagement points of the circular spline 1" and the flex spline 2" are moved in a circumferential direction and the circular spline 1" is thus driven in a speed-reduced manner.

When the rotor 16" rotates, since information indicating the rotation angle of the rotating disk 18a is prepared by the encoder 18, the rotation speed of the rotor 16" can be detected using this information.

As described above, since the circular spline 1" and the flex spline 2" are supported at both sides, high torque transmission can be enabled in addition to benefits of the drive unit 10' with reducer of FIG. 5. Also, when the same torque transmission performance as the drive unit 10' is required, the diameter in a radial direction of the drive unit 10" with reducer can be small.

Figure 10:
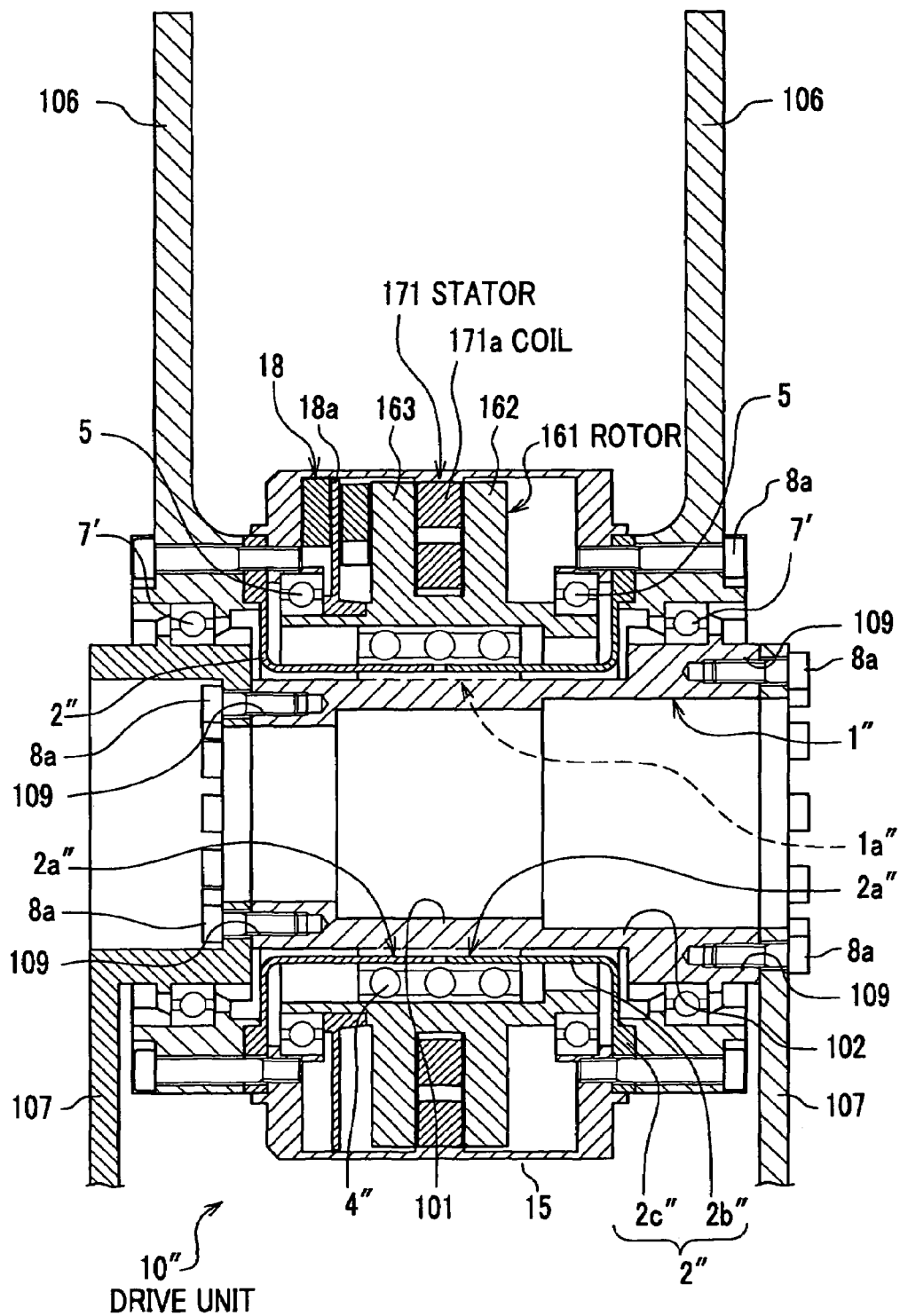
FIG. 10 is a sectional view of the drive unit with reducer when flat motor is adopted.

Next, another modification example of the drive unit 10' with reducer of FIG. 5 will be explained. FIG. 10 is a sectional view of the drive unit with reducer that adopts a flat motor.

The drive unit 10" with reducer of FIG. 10 has a stator 171 which is positioned slightly in an inner diameter side than the stator 17 of the drive unit 10' with reducer of FIG. 5. The stator 171 is provided with a coil 171a, and causes, by an energization to the coil 171a, a magnetic flux in a direction of the rotation axis of the motor, i.e. in direction of the rotation axis of each of the first link 107 and the second link 106.

At both sides in a left-and-right side in FIG. 10 of the stator 171, the rotor 161 is disposed so that the rotors 161 sandwich the stator 171.

The rotor 161 has permanent magnets 162 and 163 at both sides of the stator 171. The permanent magnets 162 and 163 cause a magnetic flux along the above described rotation axis. The rotor 161 comprises a flat motor by the stator 171 and the rotor 161 so as to rotate the rotor 161 by an energization to the stator 171.

Permanent magnets 162 and 163 of the rotor 161 are disposed at outside of the circular spline 1", and the position where permanent magnets 162 and 163 are disposed is matched to the engagement point between inner teeth 2a" of the flex spline 2" and outer teeth 1a" of the circular spline 1".

In the drive unit 10" with a reducer having these configurations, a predetermined positional relation is maintained between a direction of the magnetic flux elongation and the position of a bearing, a flex spline, and a cylindrical circular spline etc. Thus, the magnetic flux to be caused by the stator 171 and the permanent magnet 162 is not influenced. Therefore, the occurrence of eddy current by an upset of a magnetic flux can be prevented, and as a result of a causing of excess heat by eddy current can be prevented.

As for the rotor 161, the thickness of the region at outside periphery of the engagement point between inner teeth 2a" of the flex spline 2" and outer teeth 1a of the circular spline 1 is made thick. Thus, the engagement between outer teeth 1a" and inner teeth 2a" is surely achieved by the rigidity of permanent magnets 162 and 163.

Also, first bearings 5 and 5 are fitted onto the rotor 161 at both ends of the rotor 161. Thus, first bearings 5 and 5 serve as a deformation controller which controls the deformation of the rotor 161 when the rotor 161 is expanded in a radial direction by a reaction force, which is caused when the rotor 161 pushes the flex spline 2". Thereby, the rotor 161 with an apparent high rigidity and a certain engagement between outer teeth 1a" and inner teeth 2a" can be provided.

The rotor 161 with much higher apparent rigidity can be provided by fitting first bearings 5 and 5 onto the periphery of each permanent magnets 162 and 163 among the outer periphery of the rotor 161, and thus a certain engagement between outer teeth 1a" and inner teeth 2a" can be achieved.

Especially, it is effective, if permanent magnets 162 and 163 are disposed at an outer periphery of outer teeth 1a" and inner teeth 2a". Here, the deformation controller for controlling the deformation of the rotor is not limited to a bearing, and a ring-like shaped member may be adopted instead of the bearing. In this case, this ring-like shaped member is fitted onto an outer periphery of the permanent magnets 162 and 163. In this embodiment, since the stator 171 and the rotor 161 are configured as a flat motor, the outer diameter of the stator 171 becomes small, and the size of the drive unit 10" with reducer can be compacted.

Next, as application example of the drive unit with reducer, the drive unit 10' with reducer which is used in a leg type mobile robot will be explained.

Figure 11:
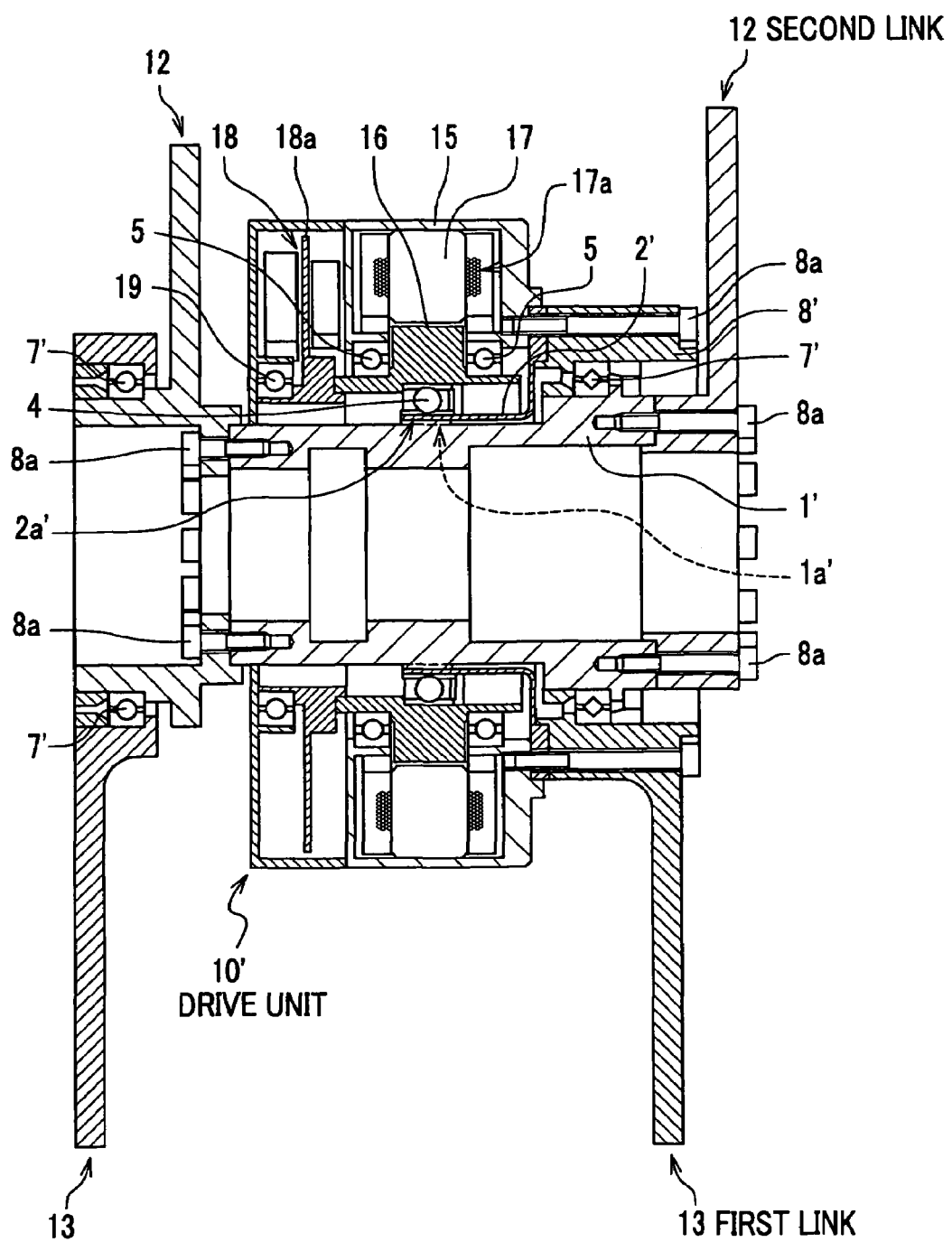
FIG. 11 is a sectional view of the joint of a leg of a leg type mobile robot.
Figure 12:
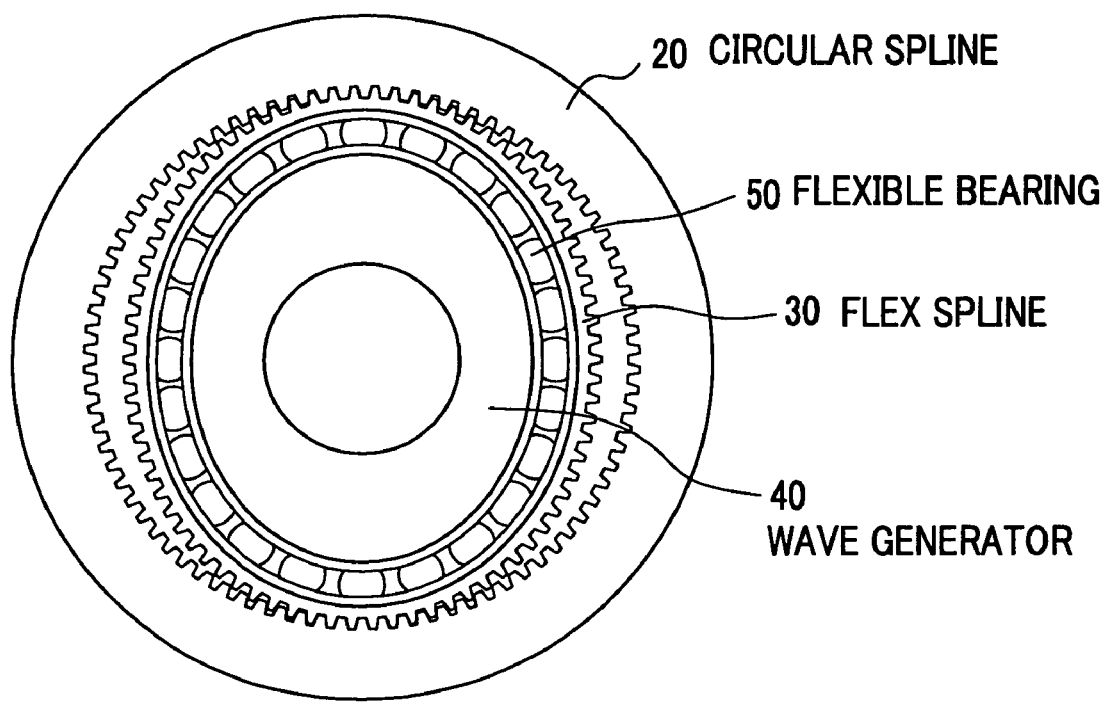
FIG. 12 is a diagram showing a conventional harmonic drive gearing.
Figure 13:
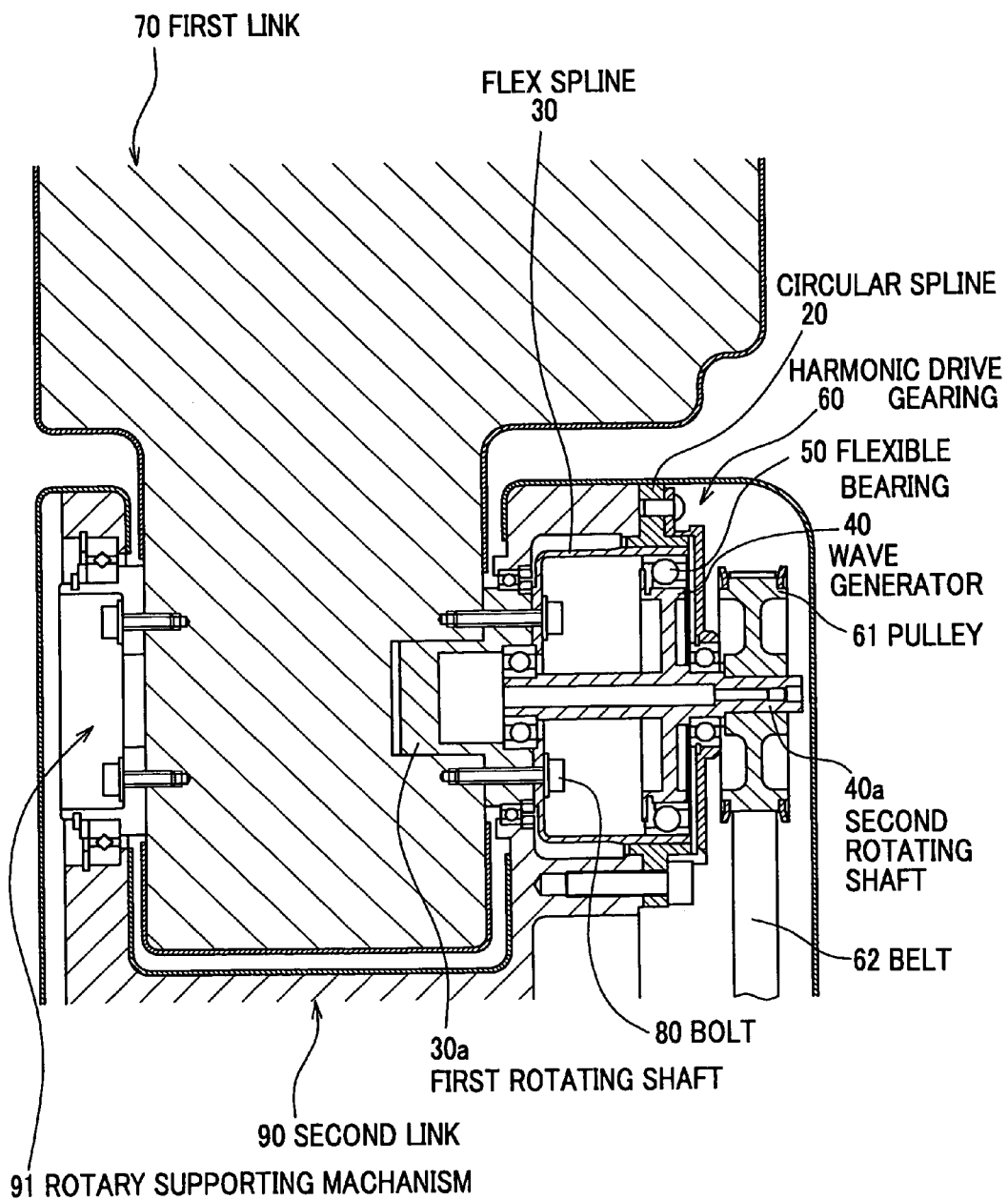
FIG. 13 is a diagram showing a joint of a leg of a leg type mobile robot that uses the conventional harmonic drive gearing.

FIG. 11 is a sectional view of a joint of a leg of the leg type mobile robot.

As shown in FIG. 11, in the drive unit 10' with reducer, the circular spline 1' is joined to a second link 12 by bolts 8a at both ends of the circular spline 1'.

That is, the second link 12 is integrated with the circular spline 1'. A first link 13 is rotatably supported by the circular spline 1' through a second bearing 7' at a right side in FIG. 11, and is rotatably supported by the second link 12 at a left side in FIG. 11.

Second links 12 and 12 of left-and-right are united together at an upper side, and first links 13 and 13 of left-and-right are united together at a lower side.

Here, when the rotor 16 is rotated by the actuation of the drive unit 10' with reducer, inner teeth 2a' of the flex spline 2' are engaged to outer teeth 1a' of the circular spline 1', and thus the circular spline 1' is driven in a speed-reduced manner. As a result, the second link 12 is turned slowly with respect to the first link 13.

When the drive unit 10' is driven in this manner, since a driving force can be output uniformly from both sides of the circular spline 1', the first link 13 and the second link 12 can be rotated in a well-balanced manner.

Additionally, since the rotor 16 has the function of a wave generator, the first link 13 and the second link 12 are rotated mutually with good response by rotating at high speed the rotor 16.

Here, since the rotation speed of the circular spline 1' is low, the harness will not be damaged as a result of the slide on the inner surface of the through hole even when a harness is set inside a through hole which was formed at the center of the circular spline 1'. Thereby, the reliability of the robot can be improved.

Also, for example, the fluid is surely reached to target portions, even when a fluid is made to flow in order to lubricate the drive unit 10' with reducer. This is because the occurrence of the disturbance of the reaching of the fluid to target portions due to a high centrifugal force is not caused when the rotation speed is low.

The invention claimed is:

1. A drive unit with reducer comprising:
   a circular rigid gear, having outer teeth formed on an outer peripheral surface;
   an annular flexible gear, positioned at the outside of the rigid gear, having an inner peripheral length that is greater than the outer peripheral length of the rigid gear, and having inner teeth, which are engageable with the outer teeth of the rigid gear, formed on an inner peripheral surface; and
   a wave generator, deflecting the flexible gear in radial directions to make the inner teeth of the flexible gear engage with the outer teeth of the rigid gear and moving the engagement positions, at which the flexible gear is deflected, in a circumferential direction, wherein
   the wave generator is a rotor of a motor.

2. A drive unit with reducer comprising:
   a circular rigid gear, having outer teeth formed on an outer peripheral surface;
   an annular flexible gear, positioned at the outer side of the rigid gear, having an inner peripheral length that is greater than the outer peripheral length of the rigid gear, and having inner teeth, which are engageable with the outer teeth of the rigid gear, formed on an inner peripheral surface; and
   a wave generator, deflecting the flexible gear in radial directions to make the inner teeth of the flexible engage with the outer teeth of the rigid gear and moving the engagement positions, at which the flexible gear is deflected, in a circumferential direction, wherein
   the wave generator is a rotating member, which is positioned at the outside of the flexible gear in a manner enabling rotation with respect to the flexible gear and is equipped with pressing portions that press and thereby deflect the flexible gear in radial directions, and wherein
   the rotating member is a rotor of a motor.

3. A drive unit with reducer according to claim 1 or claim 2, wherein
   a stator of the motor which rotates the rotor is disposed at outer peripheral side of the rotor, and
   the rigid gear is joined to a first member, and is rotatably supported by a second member at both ends of the rigid gear.

4. A drive unit with reducer according to claim 1 or claim 2, wherein
   a total of two flexible gears having a cylindrical part with the same diameter are provided, and
   flexible gears are disposed so that one end of each of flexible gears is face to face each other, and are respectively engageable to the rigid gear, and
   each of flexible gears is supported at the other end thereof.

5. A drive unit with reducer according to claim 1 or claim 2, wherein
   the rotor comprises:
   an inner peripheral surface formed to an elliptical shape; and
   a plurality of magnets disposed on the inner peripheral surface, wherein
   a plurality of magnets are disposed symmetrically with respect to a major axis or minor axis of the elliptical shape.

6. A drive unit with reducer according to claim 1 or claim 2, wherein
   a deformation controller which controls the deformation of the rotor is disposed at outer periphery of the rotor.

7. A drive unit with reducer according to claim 1 or claim 2, wherein
   the rotor is adapted to cause a magnetic flux along a rotation axis of the motor, and
   a stator is disposed facing regions wherein a magnetic flux is caused of the rotor, and wherein
   the stator is adapted to cause the magnetic flux along the rotation axis.

* * * * *